United States Patent [19]

Anderson

[11] Patent Number: 4,531,256
[45] Date of Patent: Jul. 30, 1985

[54] HIGH VACUUM APPARATUS

[75] Inventor: William H. Anderson, Omaha, Nebr.

[73] Assignee: Dunrite, Inc., Fremont, Nebr.

[21] Appl. No.: 603,928

[22] Filed: Apr. 26, 1984

[51] Int. Cl.³ .............................................. A47L 5/36
[52] U.S. Cl. ................. 15/300 A; 15/327 R; 15/352
[58] Field of Search ............. 15/300 A, 327 R, 352, 15/347, 327 D, 353

[56] References Cited

U.S. PATENT DOCUMENTS

| | | | |
|---|---|---|---|
| 1,691,988 | 11/1928 | Olson | 15/327 R |
| 3,585,788 | 6/1971 | Wilson | 15/347 X |
| 3,910,781 | 10/1975 | Bryant | 15/352 X |
| 4,017,281 | 4/1977 | Johnstone | 15/352 X |
| 4,162,149 | 7/1979 | Mekelburg | 15/352 X |

Primary Examiner—Chris K. Moore
Attorney, Agent, or Firm—Zarley, McKee, Thomte, Voorhees & Sease

[57] ABSTRACT

A high vacuum apparatus includes a vacuum tank having a pair of upstanding conical side walls arranged with the centers thereof extending outwardly in opposite directions. A peripheral side wall structure interconnects the peripheral edges of the conical side walls to define an internal enclosure. An inlet opening is provided through one side wall adjacent the top of the tank and the top of the tank is open for connection to a vacuum source.

12 Claims, 5 Drawing Figures

HIGH VACUUM APPARATUS

BACKGROUND OF THE INVENTION

The present invention is directed generally to a vacuum machine and more particularly to a vacuum tank of a design that is operative to pack and separate material from the air stream without collapsing the vacuum chamber.

The removal of dirty and wet grain from boot pits, the basements in commercial grain elevators, is a need not adequately met by known vacuum apparatus. The grain is heavy and resists being moved from a stationary position by air alone. If the grain is to be lifted vertically by air, the difficulty is compounded since the weight load keeps increasing with distance. Wet grain, as found in commercial grain elevator boot pits, becomes extremely difficult to lift vertically out of the pit by air alone. The weight of the grain is not only increased by water but the grain also becomes glued together.

When enough power is applied to overcome this natural resistance, then the air pressure is so great that the grain will not leave the air stream but discharges right out of the tank with the air. The standard procedure in the prior art has been to install cyclones and/or air locks whose function is to separate the grain from the air stream.

The prior art exhibits a conspicuous absence of any experiments or writings on the subject of an improved vacuum Accordingly, a primary object of the invention is to provide an improved vacuum tank which is operative to separate material from the air stream by flow design and not by filters.

Another object is to provide an improved vacuum tank wherein material is packed in the tank to save space.

Another object is to provide an improved vacuum tank which does not indent, wrinkle or collapse due to atmospheric pressure.

Another object is to provide an improved vacuum tank which is simple and rugged in construction, economical to manufacture and efficient in operation.

SUMMARY OF THE INVENTION

The high vacuum apparatus of the present invention includes a main tank having a pair of upstanding conical side walls arranged with the centers thereof extended outwardly in opposite directions. A peripheral side wall structure interconnects the peripheral edges of the conical side walls to define an internal enclosure. An inlet opening is provided through one side wall adjacent the top of the tank and the top of the tank is open for connection to a vacuum source. The air/material mixture entering through the inlet opening circulates within the housing sprueing the grain to the outside in the cones. The dead grain simply slides down the cone to fill up the tank, while tightening the circumference of the air swirl. The air exits through the top opening and the grain remains in the tank to be discharge through a lower door.

The inlet opening is inclined upwardly and outwardly from the side wall and is positioned for intersection by a vertical plane through the centers of the side walls. The vacuum source is preferably mounted in a housing on top of the vacuum tank and powered by internal electric motors. The entire apparatus is supported on wheels for complete portability.

DESCRIPTION OF THE PREFERRED EMBODIMENT

Figure 1:
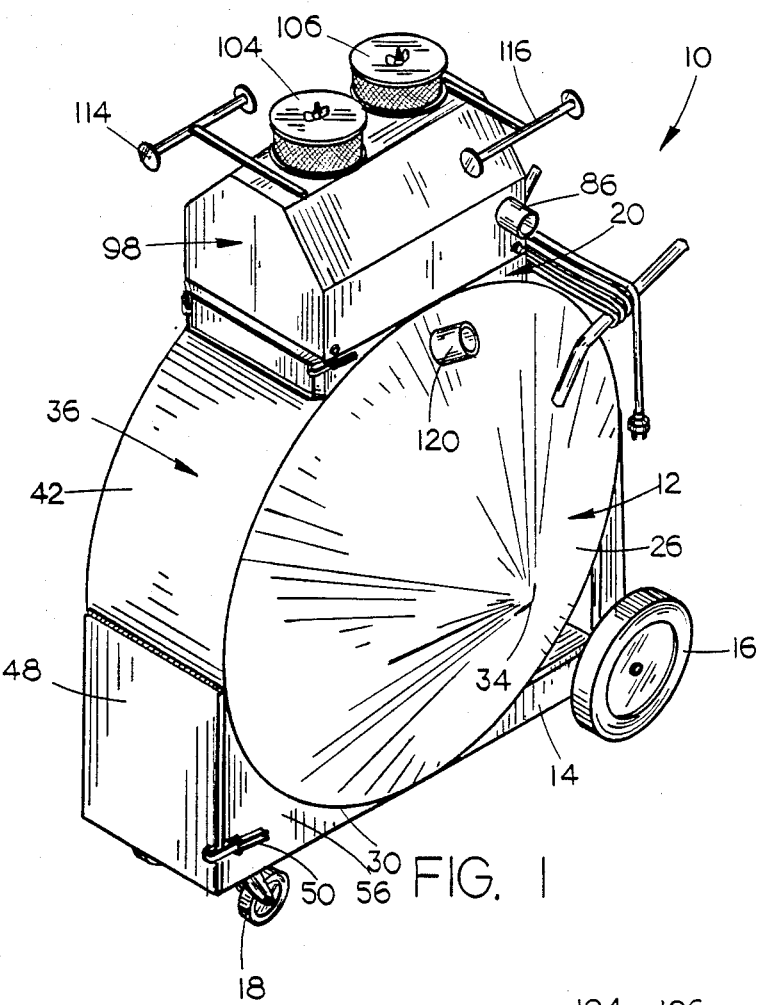
FIG. 1 is a perspective view of the high vacuum apparatus of the invention.

The high vacuum apparatus 10 of the present invention is shown in the drawings as including a main tank 12 supported on a frame 14 having large rear transport wheels 16 and front caster wheels 18. A motor housing 20 is arranged on top of the tank 12 and a pair of handles 22 extend upwardly and rearwardly from the tank for pushing it from place to place.

An important feature of the present invention is to the shape of the main tank 12. Tank 12 includes a pair of upstanding conical side walls 24 and 26, each having a circular peripheral edge 28 and 30 respectively, and points or centers 32, 34 which extend outwardly in opposite directions. Thus externally, the side walls are convex and preferably of conical shape.

The peripheral edges 28 and 30 of the side walls are interconnected by a peripheral wall structure 36 including an arcuate rear wall 38, a horizontally forwardly extended bottom wall 40 and an arcuate front wall 42 which merges into an upright wall portion 44 having a discharge opening 46 therethrough which is normally closed by a hinged door 48 adapted for securement in a closed position by latches 50 and 52. Side wall portions 54 and 56 extend downwardly and forwardly from side walls 24 and 26 to complete the lower forward corner of the enclosure.

Figure 5:
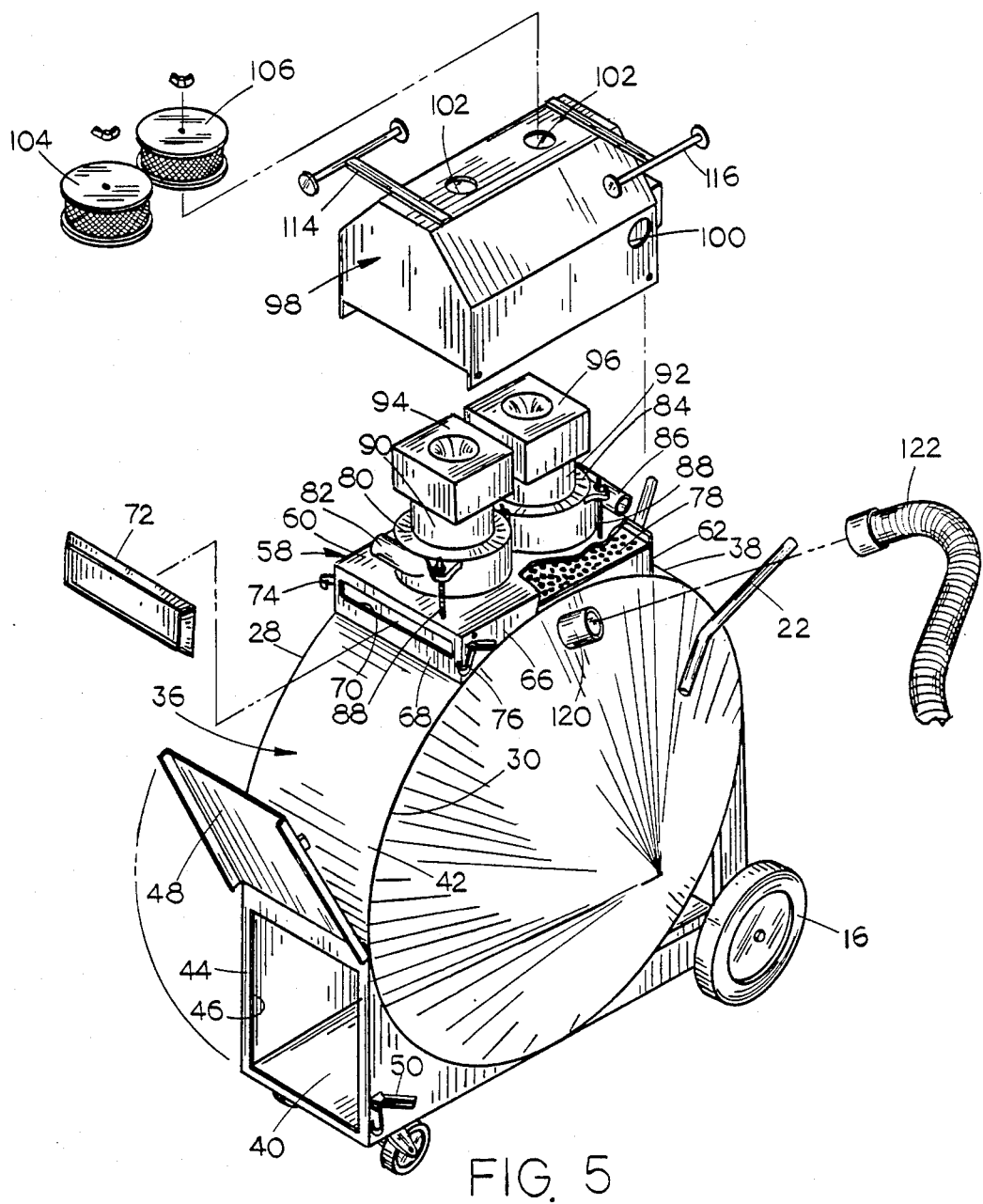
FIG. 5 is a partially exploded perspective view thereof.

The top of the housing between rear wall 38 and front wall 42 is open but is completely covered by the motor housing 20. Referring to FIG. 5, the motor housing 20 includes a base 58 having a top wall 60, rear wall 62 and side walls 64 and 66. A front wall 68 has an elongated inspection hole 70 adapted to be closed in use by a cover 72 which is removably held in place by latches 74 and 76. A perforated horizontal steel plate 78 is positioned just below top wall 60 to serve as a permanent filter for the vacuum source. Top plate 60 has a pair of longitudinally spaced-apart openings, each of which is covered by three 17,150 rpm turbines arranged as a stacked unit 80 and having a single peripheral discharge outlet 82. Likewise, rear turbine unit 84 has an oppositely and transversely directed discharge outlet 86. The turbine units are secured onto base 58 by upstanding studs 88. Front and rear 2½ horsepower motors 90 and 92 are mounted on the turbine units 80 and 84 for operating the same. Internal filters 94 and 96 are mounted on motors 90 and 92 to clean the cooling air for the motors.

A housing cover 98 is removably secured over the turbine units and includes side openings 100 for registration with the turbine discharge outlets 82 and 86 and top inlet openings 102 situated for registration with the internal filters 94 and 96. A pair of external air filters 104 and 106 are secured on top of the cover over openings 102. The turbine motors 90 and 92 are actuated by on/- off switches 108 and 110 and power is supplied through an electrical cord 112.

A pair of generally T-shaped filter bag support hangers 114 and 116 extend transversely outwardly in opposite directions from the top of cover 98. These are for the purpose of supporting 30 inch long heavy felt filter bags having throats adapted for connection to the turbine outlets 82 and 86 as a final collector of any dust in the exhaust air.

The air/material inlet opening 118 for the vacuum tank is positioned on one side wall adjacent the top of the tank. It is longitudinally centered on the tank at a position for intersection by a vertical plane through the centers of both side walls. An upwardly and outwardly directed inlet tube 120 is provided to facilitate connection to a vacuum hose 122.

In operation, the on/off switches 108 and 110 are pushed to actuate electric motors which operate the high speed turbines which create a substantial vacuum within main tank 12. Air is forcefully drawn through inlet tube 120 as indicated by arrow 124 and is rapidly circulated in the tank by the high vacuum as indicated by arrows 126, 128, 130 and 132 prior to discharge upwardly through the motor housing as indicated by arrow 134 for exhaust through the turbine discharge outlets 82 and 86.

Figure 2:
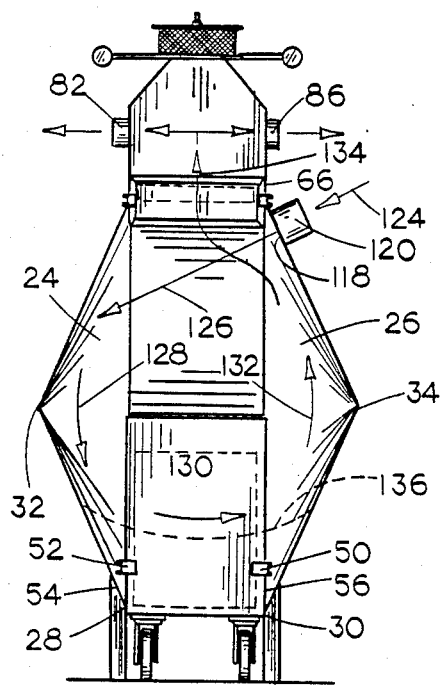
FIG. 2 is a front elevational view thereof with arrows indicating material flow through the apparatus.
Figure 3:
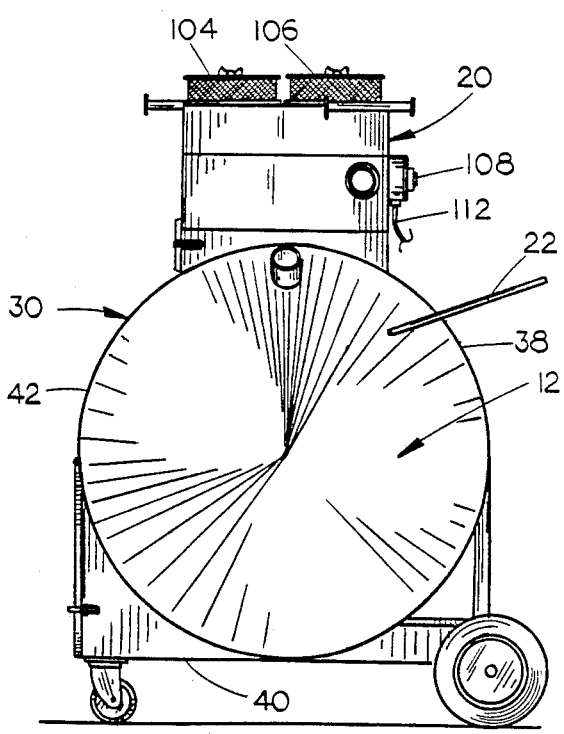
FIG. 3 is a side elevational view thereof.
Figure 4:
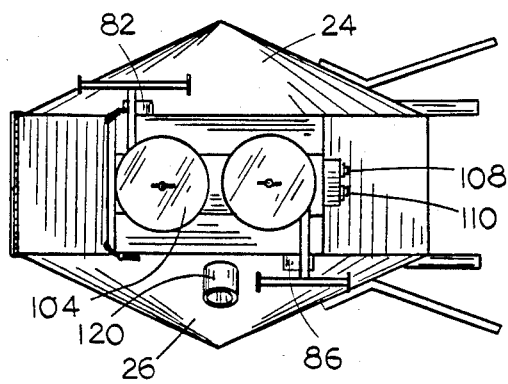
FIG. 4 is a top plan view thereof.

The high speed air goes round and round bouncing off the inclined conical side walls spruing the grain to the outside in the cones. The separated grain simply slides down the cone to fill up the tank tightening the circumference of the air swirl. The top surface of material in the tank is indicated by dotted line 136 in FIG. 2. The centrifugal force of the air swirl within the tank packs the material at the bottom of the tank to save space. Furthermore, the density of the packed material is such that the top surface 136 becomes hard thereby diverting the air flow in the opposite direction for exhaust without the separated material.

Whereas specific dimensions are not critical to the present invention, the following dimensions are applicable to a preferred embodiment and have been arrived at through extensive experiments for designing a vacuum tank of maximum efficiency. Each of the conical side walls has a 36 inch diameter and an 8 inch depth. The peripheral wall structure 36 has a width of 12 inches. Inlet tube 120 is provided as a 3 inch outside diameter pipe and each turbine communicates with the main tank through a 2 inch diameter opening through top wall 60. A 3 inch vacuum hose is recommended with a 1½ inch hose being optional. The tank is preferably of all steel construction. An aluminum alloy and plastic were tried but the material abrasion burned pin holes through walls of these materials. The tank capacity of the preferred embodiments is 62 gallons with a water lift capability of 184.

Whereas the proportion of the depth of the cones to the width of the peripheral wall structure is not critical to the present invention, it is an important contributing factor to the capability of the tank to successfully fill itself to about the three-quarters full level. Thus it is preferred that the depth of each cone be less than the width of the peripheral wall structure, which width is preferably less than the radius of the peripheral edge of each cone.

Whereas preferred embodiment of the invention has been shown and described herein, many modifications, additions and substitutions may be made which are within the intended broad scope of the appended claims. Specifically, a primary feature of the present invention is the novel design of the vacuum tank itself. The arrangement and selection of motors, turbines, filters, handles, wheeled supports and the like are not critical to the present invention and may be selected to accommodate the design criteria of various particular applications for the vacuum tank of the invention.

Thus there has been shown and described an improved high vacuum apparatus which accomplishes at least all of the stated objects.

I claim:

1. A high vacuum apparatus, comprising
a main tank comprising a pair of upstanding round side walls having substantially circular peripheral edges, a peripheral front, bottom and rear wall structure interconnecting said peripheral edges, said tank being open at the top for exhausting air therefrom and said tank including an air/material inlet opening through an upper portion of one side wall,
a vacuum source closing the top of said tank and operative to exhaust air therethrough thereby creating a vacuum within said tank,
said upstanding side walls being substantially conical in shape with centers extended outwardly in opposite directions whereby said tank is wider at the center than at the peripheral edge thereof.

2. The vacuum apparatus of claim 1 further comprising an inlet tube in communication with said inlet opening and extending upwardly and outwardly therefrom.

3. The vacuum apparatus of claim 2 wherein said inlet opening is arranged adjacent the top of said tank at a position for intersection by a vertical plane through the centers of said side walls.

4. The vacuum apparatus of claim 2 further comprising a vacuum hose and means for connecting said vacuum hose to said inlet tube.

5. The vacuum apparatus of claim 1 wherein said vacuum source comprises a turbine having an inlet in communication with the top of said tank, an outlet to the ambient air and a motor connected to said turbine for operating the same.

6. The vacuum apparatus of claim 5 wherein said turbine is one of a plurality of stacked turbines.

7. The vacuum apparatus of claim 1 further comprising a material removal door through a lower portion of said tank.

8. The vacuum apparatus of claim 1 further comprising a filter at the top of said tank and interposed between said tank and vacuum source.

9. A vacuum tank, comprising
a pair of upstanding substantially conical side walls arranged with the peripheral edges thereof in transversely spaced-apart relation and with the centers thereof extended outwardly in opposite directions and a peripheral side wall structure interconnecting said peripheral edges to define an internal enclosure,
at least one side wall having a material/air inlet opening therethrough at a position adjacent the top of the tank,
said enclosure being open at the top through a vacuum source opening, and
means for operatively connecting a vacuum source to said vacuum source opening.

10. The vacuum tank of claim 9 wherein said inlet opening is positioned for intersection by a vertical plane through the centers of said conical side walls.

11. The vacuum tank of claim 9 wherein the depth of each conical side wall is less than the width of said peripheral wall structure, which width is less than the radius of the peripheral edge of each conical side wall.

12. The vacuum tank of claim 11 wherein the depth of said conical side walls are the same.

* * * * *